US008560416B1

(12) United States Patent (10) Patent No.: US 8,560,416 B1
Hellman, Jr. et al. (45) Date of Patent: *Oct. 15, 2013

(54) APPARATUS AND METHOD FOR CONVERTING INVESTMENT CAPITAL INTO PUBLICLY TRADED AND PRIVATE MASTER LIMITED PARTNERSHIPS

(75) Inventors: Robert B. Hellman, Jr., Menlo Park, CA (US); Kunal Sarkar, Santa Clara, CA (US)

(73) Assignee: American Infrastructure Funds, LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,026

(22) Filed: Aug. 8, 2012

Related U.S. Application Data

(63) Continuation of application No. 13/271,437, filed on Oct. 12, 2011, now Pat. No. 8,244,615, which is a continuation of application No. 11/558,371, filed on Nov. 9, 2006, now Pat. No. 8,041,615.

(60) Provisional application No. 60/735,321, filed on Nov. 9, 2005.

(51) Int. Cl.
*G06Q 40/00* (2012.01)
(52) U.S. Cl.
USPC ............................................. 705/35; 705/37
(58) Field of Classification Search
USPC ........................................... 705/35, 37
See application file for complete search history.

(56) References Cited

U.S. PATENT DOCUMENTS

| | | | |
|---|---|---|---|
| 4,034,735 A | 7/1977 | Waldrip | |
| 5,991,876 A | 11/1999 | Johnson et al. | |
| 6,766,322 B1 | 7/2004 | Bell | |
| 7,734,540 B2 | 6/2010 | Ramsey | |
| 7,797,225 B1 | 9/2010 | Kemp et al. | |
| 7,865,416 B1 | 1/2011 | Graff et al. | |
| 2002/0004757 A1 | 1/2002 | Torres et al. | |
| 2002/0013750 A1 | 1/2002 | Roberts et al. | |
| 2002/0046144 A1 | 4/2002 | Graff | |
| 2002/0099563 A1 | 7/2002 | Adendorff et al. | |
| 2002/0161679 A1* | 10/2002 | Randolph et al. | 705/35 |
| 2005/0091150 A1 | 4/2005 | Woeber | |
| 2007/0219712 A1 | 9/2007 | Abhyanker | |
| 2008/0046353 A1 | 2/2008 | Poltorak et al. | |
| 2008/0109385 A1 | 5/2008 | Baker | |
| 2009/0018875 A1 | 1/2009 | Monatesti et al. | |
| 2009/0228306 A1 | 9/2009 | Izyayev et al. | |
| 2010/0205085 A1 | 8/2010 | Ramsey | |
| 2011/0004483 A1 | 1/2011 | Ting et al. | |
| 2012/0190386 A1 | 7/2012 | Anderson | |

OTHER PUBLICATIONS

AARP, Public Policy Institute, The Death Care Industry, May 2000, 8 pgs.

(Continued)

*Primary Examiner* — Ojo O Oyebisi
(74) *Attorney, Agent, or Firm* — Cooley LLP

(57) ABSTRACT

A method of generating income includes receiving investment capital from an investor. The investment capital is invested in publicly traded master limited partnerships to generate a revenue stream. The investment capital is also invested into a private company. The private company is subsequently converted to a master limited partnership to generate an equity gain. A portion of the revenue stream and a portion of the equity gain are distributed to the investor.

2 Claims, 6 Drawing Sheets

(56) References Cited

OTHER PUBLICATIONS

Berry et al., "Master Limited Partnerships: The Hot New Form of Business Organization", NJ, Law and Business, Inc., 1986, p. i-25, 14 pgs.

Canada Newswire, "CI Announces Proposed Merger Details for Limited Partnerships", Ottawa: Apr. 9, 2001, 3 pgs.

Ciccotello et al., "Contracts Between Managers and Investors: A Study of Master Limited Partnership Agreements", Robinson College of Business Administration, Georgia State University, Atlanta, Jun. 1999, 47 pgs.

Downes et al., "Dictionary of Finance and Investment Terms—5th Edition", Barron's Educational Series, Inc., Hauppauge, NY, 1998, 3 pgs.

Goodgame, "Master Limited Partnership Governance", The Business Lawyer, vol. 60, Feb. 2005, pp. 471-506.

Green Hills Memorial Park, General Price List, Feb. 15, 1995, 3 pgs. [online] [retrieved on Jan. 14, 2008] Retrieved from the Internet: <URL: http://web.archive.org/web/19990219192616/www.greenhillsmemorial.com/merch.html>.

Illinois Landfill Capacity, "Solid Waste Landfill Owners and Operators: Alphabetical by Facility", Nonhazardous Solid Waste Management and Landfill Capacity in Illinois, 1996, 3 pgs.

Miller, "The Garbage Behind, The Garbage Ahead", Gotham's Garbage: The Free Market and The Hidden Costs of Turning Trash Into Cash, Oct. 6, 2001, 13 pgs.

New York State, "Cemetery Bulletin", Department of State, Division of Cemeteries, Mar. 2000, No. 4, 2 pgs.

Peltier, "Lawsuit Blames New York Landfills for Health Woes", Waste News, vol. 6, Issue 44, Apr. 22, 2001, p. 49, 2 pgs.

PR Newswire, "AmeriGas Partners $100 Million Senior Notes Affirmed 'BB+' by Fitch IBCA—Fitch IBCA—", New York: Aug. 17, 1998, 3 pgs.

Reilly, "The Language of Real Estate", Chicago, 2000, 2 pgs.

Trimble Funeral Homes, Frequently Asked Questions, 5 pgs. [online] [retrieved on Jan. 14, 2008] Retrieved from the Internet <URL: http://web.archive.org/web/20010709015456/http://www.trimblefuneralhomes.com/>.

Twenty-First Century, "Twenty-First Century Partnership Systems Products/Services", 2 pgs., Wayback Machine Internet Archived webpage dated Jul. 16, 2007, <http://web.archive.org/web20070716055932/www.21stcenturycompany.coulpartnership_systems.htm>.

US Code, Title 26, Section 704, 7 pgs.

US Code, Title 26, Section 7704, 7 pgs.

Banamraoui, "Islamic Banking: The Case of Algeria", International Journal of Islamic and Middle Eastern Finance and Management, vol. 1, No. 2, 2008, pp. 113-131.

Karasik et al., "Islamic Finance in a Global Context: Opportunities and Challenges", Chicago Journal of International Law, 7(2): 379-396, Winter 2007, retrieved from http://search.proquest.com/docview/237219993?accountid=14753.

Puget Sound Regional Council, "Funding for Local Government Infrastructure", Sep. 2009, 76 pgs.

Tariq, "Managing Financial Risks of Sukuk Structures", Sep. 2004, 86 pgs.

Associated Press, "Investors Target Wests Water Rights/Easterners Hope Value Will Jump", Colorado Springs Gazette-Telegraph, Aug. 16, 1988: B8, 2 pgs.

Beckett, "Utilities/Big Spurt in Water Investments/The Gold Rush of '89 Focuses on Water to Serve Growing West", San Francisco Chronicle, Apr. 10, 1989: Cl, 3 pgs.

Colby, "Recent Trends in Southwestern Water Values", The Appraisal Journal, vol. 59, No. 4, ProQuest Central, Oct. 1991, pp. 488-500.

Denmark, "Looming Water Shortages Create Wave of Blue' Investing", Institutional Investor, ProQuest, Sep. 2010, 3 pgs.

Global Water Intelligence, "The Right to Invest in Water", vol. 10, Issue 5, May 2009, 2 pgs.

Michelsen et al., "Expectations in Water-Right Prices", Water Resources Development, vol. 16, No. 2, Jun. 2000, pp. 209-219.

The Wall Street Journal, "Alcan Keeps Terms to Itself of Proposal for Some Arco Assets", New York, NY, Mar. 30, 1984: 1, 2 pgs.

* cited by examiner

| Private Transaction | |
|---|---|
| EBITDA: | $10.0 mil |
| Cash Taxes: | $2.4 mil |
| Distributable Cash Flow: | $4.4 mil |
| Acquisition EBITDA Multiple: | 7.0x |
| Enterprise Value: | $70.0 mil |
| Debt (3.0x): | $30.0 mil |
| Equity Value: | $40.0 mil |

| Value after IPO | |
|---|---|
| EBITDA: | $10.0 mil |
| Cash Taxes: | $0.0 mil |
| Distributable Cash Flow: | $6.8 mil |
| Assumed IPO Yield: | 9.0% |
| Enterprise Value: | $105.0 mil |
| Debt (3.0x): | $30.0 mil |
| Equity Value: | $75.0 mil | ns
APPARATUS AND METHOD FOR CONVERTING INVESTMENT CAPITAL INTO PUBLICLY TRADED AND PRIVATE MASTER LIMITED PARTNERSHIPS

CROSS REFERENCE TO RELATED APPLICATIONS

This application is a continuation of U.S. patent application Ser. No. 13/271,437 filed Oct. 12, 2011, entitled, "Apparatus and Method for Converting Investment Capital Into Publicly Traded and Private Master Limited Partnerships," which is a continuation of U.S. patent application Ser. No. 11/558,371 filed Nov. 9, 2006, entitled "Apparatus and Method for Converting Investment Capital Into Publicly Traded and Private Master Limited Partnerships," (now U.S. Pat. No. 8,041,615), which claims the benefit of U.S. Provisional Application No. 60/735,321 filed Nov. 9, 2005, entitled "Apparatus and Method for Converting Investment Income Into Publicly Traded and Private MLPs," the contents of which are incorporated herein by reference.

BRIEF DESCRIPTION OF THE INVENTION

This invention relates generally to managing investment capital. More particularly, this invention relates to converting investment capital into publicly traded and private master limited partnerships.

BACKGROUND OF THE INVENTION

A master limited partnership (MLP) is a corporate organization governed by a contract between management (e.g., general partners or GPs) and investors (e.g., limited partners or LPs). A master limited partnership combines the tax benefits of a limited partnership with the liquidity of publicly traded securities. The master limited partnership was originally conceived as an organizational structure to capitalize on mature, low growth, cash generating businesses which meet certain qualification standards under the U.S. Tax Code. Accordingly, master limited partnerships have been used in such industries as oil, natural gas, real estate, and natural resources.

Master limited partnerships typically carry cash distributions of 7-10%. As such, the securities generally trade on a yield basis. In the current market environment, such securities are in high demand due to their superior yield and the lower perceived risk of the stable underlying business.

In a master limited partnership, partners receive cash distributions rather than dividends. Unlike a corporation, qualifying, publicly traded master limited partnerships are not subject to federal and state income taxes. Instead, all income, gains, losses and deductions of a partnership are passed through to the partners who are required to report their allocable share on their individual tax returns. A substantial portion of cash distributions are generally not currently taxable as long as the partner's tax basis in the partnership interest exceeds zero.

The ideal master limited partnership is cash flow positive, but generates minimal taxable income through heavy depreciation, amortization, depletion, and the like. In a partnership, tax losses and gains are passed through to the partners, but when a partnership distributes more cash than it reports as taxable income, the cash distribution amount in excess of the partner's allocable share of income is treated as a return of capital for tax purposes. Thus, under this scenario, each time an investor receives a cash distribution, the return of capital tax treatment lowers his basis in the stock rather than creating dividend income that is taxable as ordinary income in the current period.

In view of these tax advantages, master limited partnerships are predominantly retail products sold to high net worth individuals and other tax paying entities. Most master limited partnerships generate unrelated business taxable income that prevents most institutional investors from being able to invest in master limited partnerships.

The commonly owned pending patent application entitled "Apparatus and Method for Operating a Death-Care business as a Master Limited Partnership", Ser. No. 10/306,836, filed Nov. 27, 2002, discloses a technique for investing in a private company and converting the company to a master limited partnership to enhance investor yield. The contents of this patent application are incorporated herein by reference.

It would be desirable to provide more diverse investment opportunities in master limited partnerships. Such opportunities should optimize investor yield and diversification.

SUMMARY OF THE INVENTION

The invention includes a method of generating income. Investment capital from an investor is received. The investment capital is invested in publicly traded master limited partnerships to generate a revenue stream. The investment capital is also invested into a private company. The private company is subsequently converted to a master limited partnership to generate an equity gain. A portion of the revenue stream and a portion of the equity gain are distributed to the investor.

The invention also includes a computer readable storage medium with executable instructions to record received investment capital from an investor. A revenue stream derived from an investment the investment capital in a publicly traded master limited partnerships is tracked. An investment the investment capital in a private company is monitored. Equity gain derived from the conversion of the private company to a master limited partnership is documented. A portion of the revenue stream and a portion of the equity gain are distributed to the investor.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
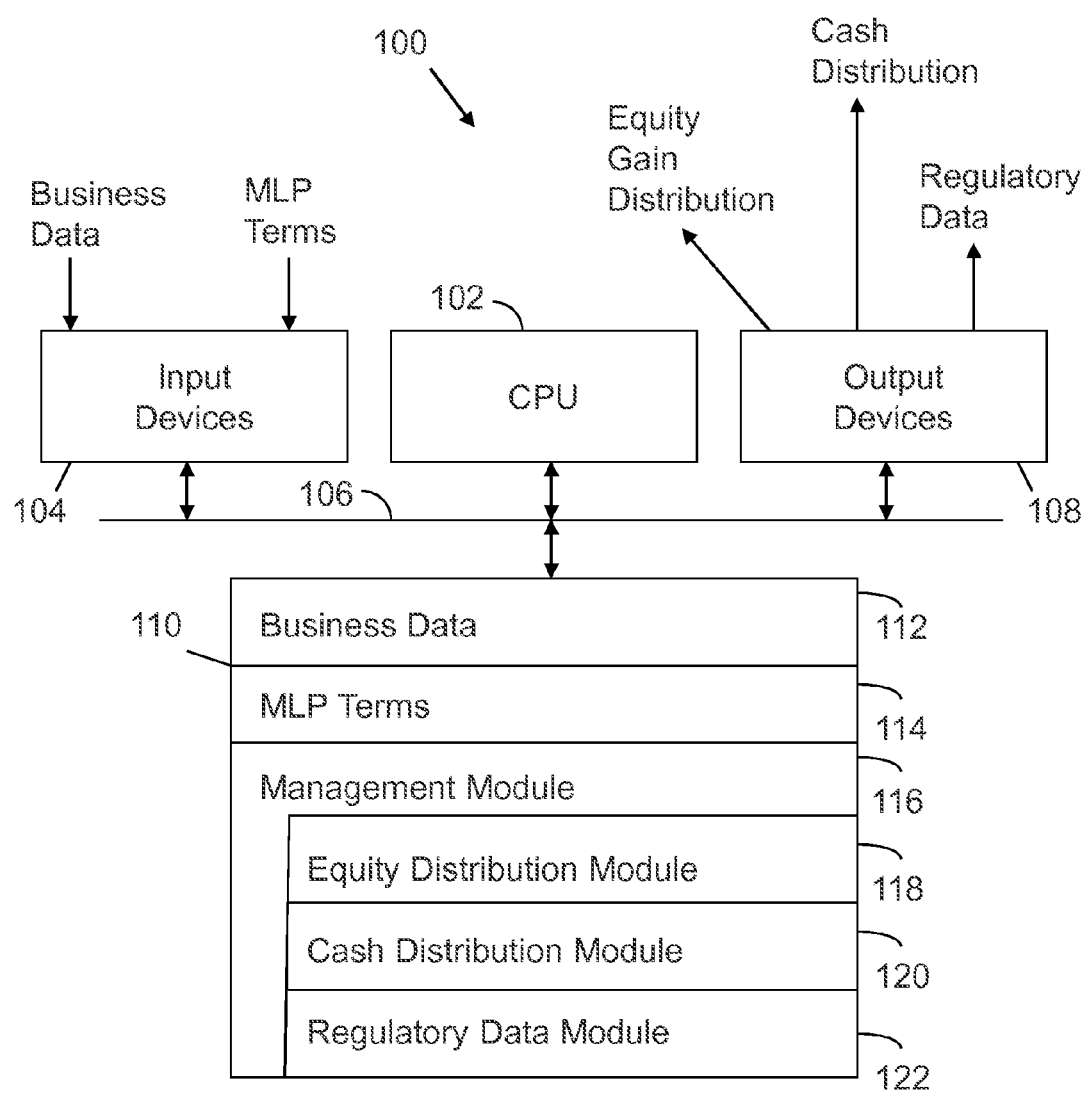
FIG. 1 illustrates a computer configured to implement operations of the invention.

FIG. 1 illustrates a computer 100 configured to implement operations of the invention. The computer 100 includes a central processing unit 102 connected to a set of input devices 104 via a bus 106. The input devices 104 may include a keyboard, mouse, data port and the like. The input devices 104 receive business data. The business data is information characterizing the operation of a commercial enterprise. Thus, the business data may include profit and loss statements, cash flow data, equity data, spreadsheets, and the like. The input devices 104 also receive master limited partnership (MLP) terms. In particular, the terms and conditions of a specified MLP are entered into the computer 100. For example, the terms may be expressed as a set of if-then-else executable instructions that characterize the rules and conditions associated with an MLP.

Output devices 108 are also connected to the bus 106. The output devices 108 may include a display, a printer, a network port, and the like. The output devices 108 are used to display or route information (e.g., data, wire transfer instructions, other payment instructions, and the like) computed in accordance with the invention.

A memory 110 is also connected to the bus 106. The memory 110 stores the business data 112 and the MLP terms 114. The memory also stores a management module 116. The management module includes executable instructions to implement operations associated with embodiments of the invention. For example, the management module 116 includes executable instructions to process the business data 112 and the MLP terms 114. An equity distribution module 118 associated with the management module 116 processes the business data 112 and the MLP terms 114 to calculate appropriate equity gain distributions to different investors. As discussed below, the equity gain distributions are based upon conversions of private companies to private MLPs and in some instances to public MLPs. As shown in FIG. 1, the output devices 108 may be used to facilitate an equity gain distribution (e.g., via a wire transfer or other payment instructions).

Similarly, the cash distribution module 120 includes executable instructions to calculate appropriate cash distributions to different investors. As discussed below, the cash distributions are based upon investments in public MLPs. Once again, the output devices 108 may be used to facilitate a cash distribution (e.g., via a wire transfer or other payment instructions).

The management module 116 may also include a regulatory data module 122 with executable instructions to generate regulatory data. By way of example, the regulatory data may be in the form of operating entity information, tax information, and the like.

Figure 2:
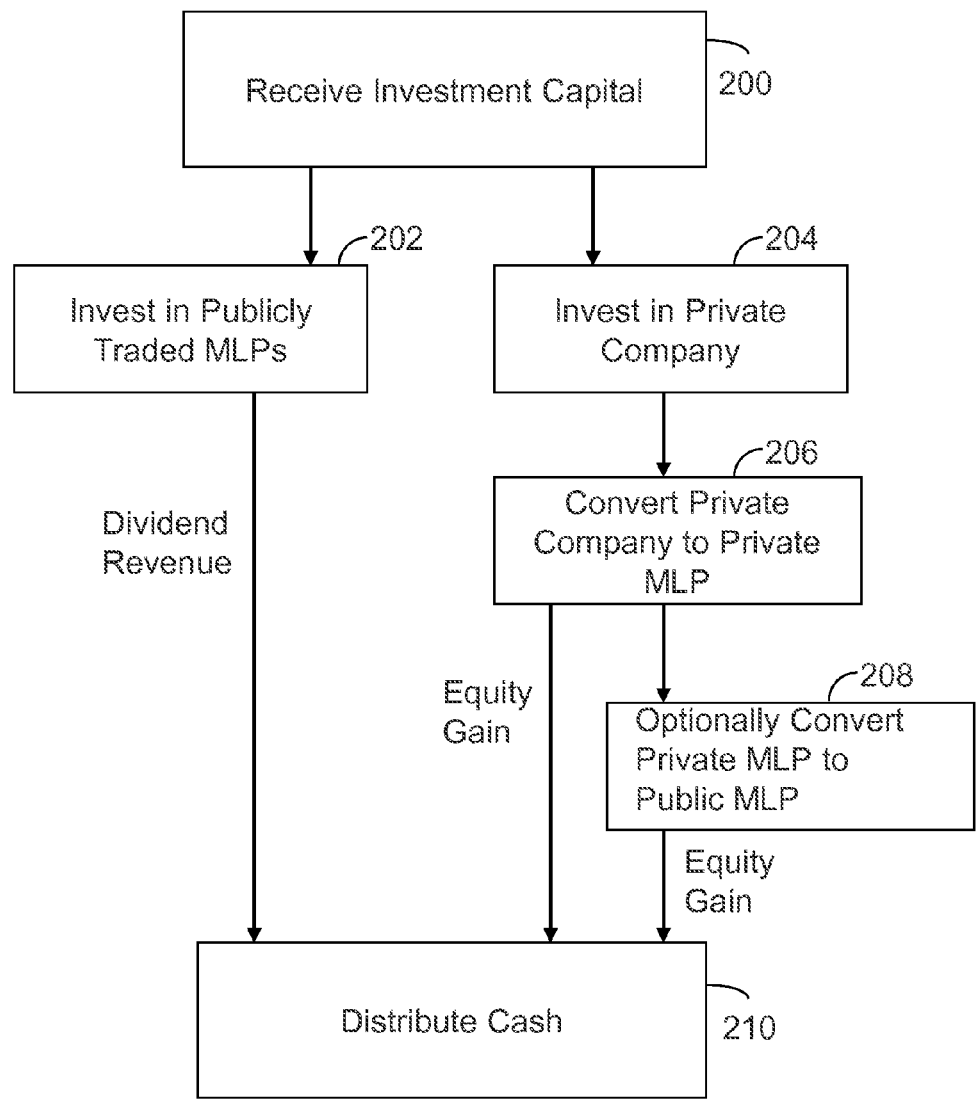
FIG. 2 illustrates processing operations associated with an embodiment of the invention.

FIG. 2 illustrates processing operations associated with an embodiment of the invention. Initially, investment capital is received 200. As discussed below, a first portion of the investment capital is invested in publicly traded MLPs 202. These investments result in dividend revenue.

A second portion of the investment capital is invested in private companies 204. In particular, as discussed below, investments are made into private companies that are suited for conversion to a MLP structure. The private company or companies are then each converted to a private MLP 206. This results in an equity gain. In some instances, a private MLP is optionally converted to a public MLP (e.g., through an initial public offering) 208. This results in a subsequent equity gain. The various forms of revenue (i.e., the dividend revenue, the equity gain and the subsequent equity gain) are then distributed 210.

Those skilled in the art will recognize a number of advantages associated with the disclosed techniques. First, the invention provides current cash distributions. MLPs typically distribute substantially all available cash flows to investors on a quarterly basis, generating attractive and stable yields. In one embodiment of the invention, committed capital is immediately draw down after closing and is invested in securities issued by MLPs. Thus, it is possible to begin receiving and paying out quarterly tax-shielded cash distributions to investors shortly following the first quarter-end thereafter. Currently, publicly-traded MLPs generate yields of 5%-8%, and have increased their distributions at a compound annual growth rate of 6.0% over the last five years.

The invention also provides a tax-advantaged yield. Cash distributions from MLPs are primarily treated as returns of capital (as opposed to capital gains or current income) for federal income tax purposes. As such, these cash distributions are largely shielded from income taxes in the current period. This favorable tax treatment allows investors to receive after-tax cash yields similar to significantly higher-yielding taxable bonds (for example, a fully tax-shielded yield of 6% to taxable investors can generate an after-tax cash yield comparable to a taxable corporate bond yielding 9%). Furthermore, MLPs also enjoy favorable estate planning attributes due to the unique tax accounting treatment applied to such cash distributions.

The invention also facilitates equity growth. For entities taken public as MLPs, the capital associated with the invention may own both Limited Partner (LP) units and general partner interests. Much like a carried interest in a traditional private investment fund, MLP partnership agreements typically provide that the MLP general partner (the "MLP GP") share in an increasing percentage of cash distributions above certain thresholds, as an incentive for the MLP GP to grow distributable cash flow. These incentives are known as Incentive Distribution Rights ("IDRs"), and the fund's investors will benefit from the fund's ownership of these IDRs in fund portfolio companies taken public as MLPs. Again, the invention will benefit from these equity gains as a result of the conversion of entities into new MLPs.

Another feature of the invention is the attractive partnership structure. Unlike other existing pooled MLP investment vehicles, the fund's partnership structure preserves the attractive tax attributes of MLP investing. For the fund, cash distributions from investments in MLP equity securities should be largely treated as returns of capital, and, therefore, be shielded from current taxes. In addition, capital gains realized in the fund's assets will be taxed at individual long-term capital gains rates. In contrast, distributions from closed-end investment companies (CEICs) are subject to higher amounts of current income taxes as such distributions are generally taxed, in part, as dividends to the CEIC investors. In addition, long-term capital gains generated by MLP-focused CEICs are taxed at higher corporate rates, as those vehicles utilize a corporate structure. By virtue of the this structure, CEIC investors do not benefit from the favorable estate planning aspects of MLP investing that the fund's partnership structure is expected to preserve. Finally, since it is possible to provide a single consolidated K-1 to investors and to file composite state tax returns for investors, the invention offers enhanced administrative simplicity for its investors when compared to investing directly in a portfolio of MLPs.

One aspect of the invention's value-added investment strategy is "private-to-public" MLP investing, a process that involves identifying businesses with stable fundamentals that can generate Qualifying Income and then restructuring those businesses and taking them public as MLPs. Another aspect of the invention's value-added investment strategy is the initial investment of substantially all capital in a portfolio of securities issued by MLPs to capitalize on the tax-advantaged current cash yield and strong growth potential in today's public MLP market. The invention may be implemented by investing in equity securities of (i) publicly traded partnerships and limited liability companies, including common and subordinated units and general partner interests, and (ii) certain affiliates of such partnerships and limited liability companies. Additionally, the invention may be implemented by investing in debt securities of MLPs on an opportunistic basis. With respect to its portfolio of MLP securities, an embodiment of the invention (e.g., a fund and its manifestation in computer code of the type discussed in connection with FIG. 1) may employ fundamental analysis to identify MLPs that are positioned to provide strong current cash flow paired with superior risk-adjusted growth potential. In addition to purchasing MLP securities through open-market transactions, a fund associated with the invention may invest in private placements of publicly-traded MLP issuers to generate enhanced returns. These private placements are typically priced at a discount to prevailing market prices and are not generally available for individual investor participation.

In addition to investing in conventional MLP industries such as energy infrastructure, it is advisable to apply a private-to-public investment strategy across a broader range of industries that could potentially generate Qualifying Income, such as mining, fertilizer, geothermal energy, wood products and real property related activities. Transactions of these types may generate attractive returns (with targeted gross IRRs in excess of 30%) due to: (i) tax efficiencies that can be realized as a result of the pass-through nature of a partnership structure; (ii) value arbitrage derived from the yield-based valuation methodology applied in the public MLP market; (iii) limited competition for such investments from traditional private equity investors; and (iv) organic growth and growth through accretive acquisitions.

Figure 3:
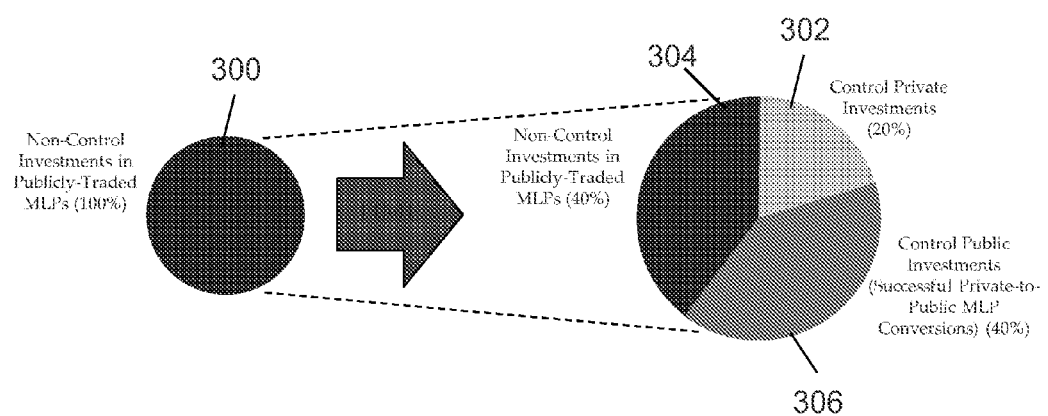
FIG. 3 illustrates yield enhancement achieved in accordance with an embodiment of the invention.

In one embodiment, a fund adopting the techniques of the invention conducts approximately two private-to-public investment per year, with the capacity to pursue additional private investments on an opportunistic basis, and to limit investment activity in private companies so that a minimum of 60% of capital is invested in securities of publicly-traded MLPs at all times. The private companies in which the fund invests are chosen and structured in such a manner as to maintain the fund's attractive cash yield. Through the conversion of privately-held businesses into publicly-traded MLPs, a fund may gradually allocate a significant majority of its asset value to public and private control transactions. FIG. 3 illustrates an example of private and public asset allocation over time. In this embodiment, all investment income is initially applied as non-control investments in publicly traded MLPs 300. This corresponds to block 202 of FIG. 2. Eventually, non-control investments in publicly traded MLPs diminish (e.g., to 40%) 304, as controlling private investments grow (e.g., 20%) 302 (corresponding to block 206 of FIG. 2). Successful private-to-public MLP conversions 306 also enhance equity. The control public investments 306 correspond to block 208 of FIG. 2.

Figure 4:
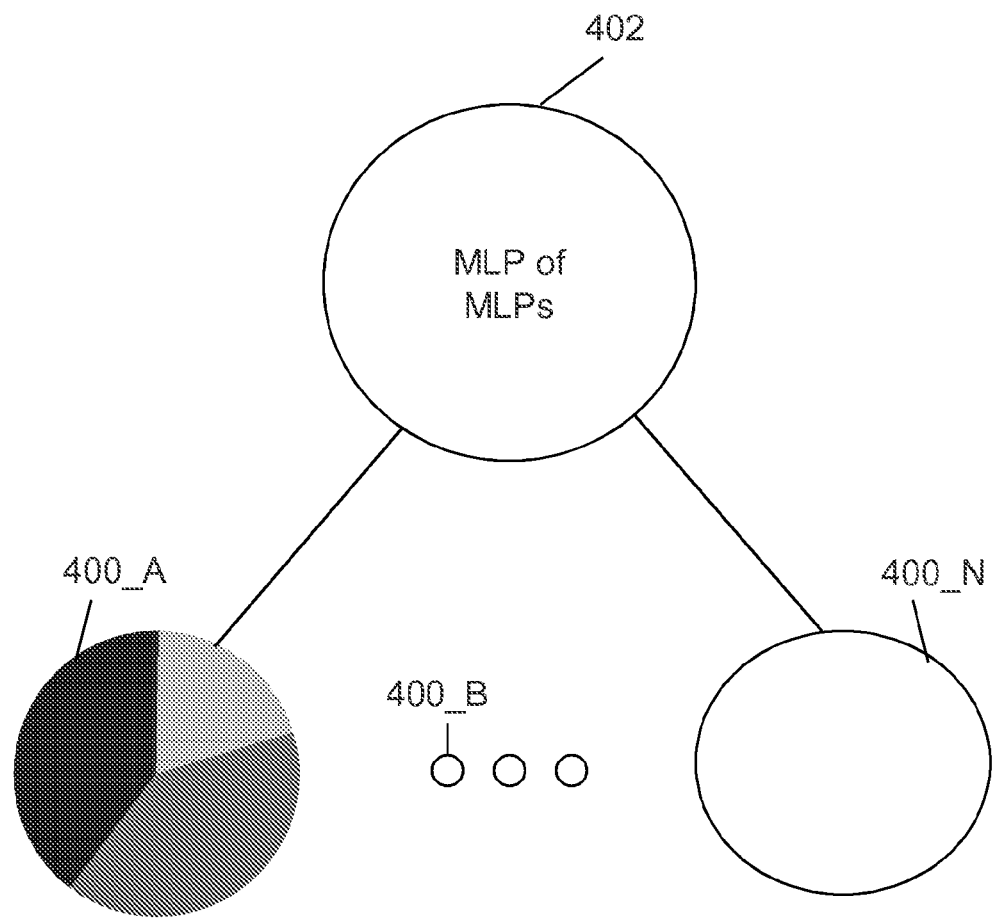
FIG. 4 illustrates a master limited partnership of master limited partnerships in accordance with an embodiment of the invention.

The foregoing investment strategy facilitates a public offering of a fund's assets as an MLP of MLPs. This concept is illustrated in connection with FIG. 4. FIG. 4 illustrates a first MLP 400_A, such as the MLP discussed in connection with FIG. 3. This MLP includes multiple MLPs that may be offered in the aggregate through an initial public offering. Additional MLPs (e.g., 400_B through 400_N) may also be formed. By way of example, each additional MLP may be in a different sector (e.g., mining, forestry, and the like) or may individually have internally diverse investment strategies (e.g., petroleum, natural gas in a single MLP). For example, one MLP may apportion approximately 45% of its assets in natural gas pipelines, terminalling and distribution, 27% of its assets in oil pipelining, terminalling and distribution, 7% of its assets in propane, 7% of its assets in other natural resources and 8% of its assets in other investments.

Regardless of the nature of the individual MLPs, a set of MLPs are controlled by a single MLP 402. In one embodiment, this MLP of MLPs 402 is a publicly traded security. Thus, an investor buys a single security and receives a diversified portfolio—a security which is very unique and valuable for individual investors. In addition, the single security means that a single K1 is provided to investors for tax purposes, thereby simplifying the tax payment process for investors.

The MLP of MLPs associated with the embodiment of the invention of FIG. 4 operates as an exchange fund. An exchange fund is an investment that enables an individual with significant holdings in a single stock to invest in a diversified portfolio without incurring capital gains taxes. The MLP of MLPs provides liquidity for assets held in partnerships.

If the invention is implemented to include an initial public offering, the initial public offering provides increased liquidity to investors and allows access to public market capital, while preserving the tax-efficient attributes of the fund's partnership structure. In the event that the fund does not consummate such a public offering, liquidity may be provided to investors through a liquidation of the fund's assets at the end of the term. Regardless of the manner in which liquidity is achieved, in one embodiment, the general partner's carried interest is applied only upon full return of capital (including in connection with an initial public offering), such that the principals' economic interests are tied directly to investors' ability to have liquidity.

Attention now turns to various investment highlights associated with embodiments of the invention. As previously mentioned, the invention may immediately provide tax-shielded current cash distributions with growth potential. Unlike a typical private equity fund, the fund will draw down all committed capital on day one and invest it in a portfolio of MLP securities. As a result, the fund expects to pay tax-shielded quarterly distributions to its investors shortly after the first quarter-end post-closing. In addition, since the fund will invest in publicly-traded MLPs, which, as a class, have increased cash distributions at an average compound annual growth rate of 6.0% over the past five years, the fund's cash distributions from publicly-traded MLP investments may grow over time.

The purchase of private businesses with stable fundamentals and recurring cash flows that generate Qualifying Income and can be restructured and taken public as MLPs represents a unique private-to-public MLP investment strategy. In addition to investing in conventional MLP industries such as energy infrastructure, it is possible to apply the disclosed private-to-public MLP investment strategy across a broader range of industries that could potentially generate Qualifying Income such as mining, fertilizer, geothermal energy, wood products and real property related activities. These private-to-public MLP transactions are expected to remove a layer of corporate taxes, give the target company access to public capital for growth, and provide additional value by capitalizing on potential financial arbitrage opportunities associated with yield-based valuations. Successful private-to-public MLP investments may generate very attractive gross IRRs (e.g., over 30%).

The partnership structure associated with an embodiment of the invention provides a tax efficient platform for MLP investing. Preferably, the partnership structure preserves the attractive tax attributes of MLP investing, as cash distributions should be largely treated as returns of capital, and, therefore, be shielded from current taxes. In addition, capital gains realized by the fund will be taxed at individual capital gains rates. In contrast, capital gains generated by MLP-focused CEIC are taxed at higher corporate rates, as these vehicles utilize a corporate structure. In addition, distributions from CEICs are subject to current income taxes as they are generally taxed as dividends to the CEIC investors. By virtue of the CEIC's corporate structure, CEIC investors do not benefit from the favorable estate planning aspects of MLP investing that the fund's partnership structure is expected to preserve. Finally, since the fund expects to provide a single consolidated K-1 to investors and to file composite state tax returns for investors where possible, the fund should offer enhanced administrative simplicity for its investors when compared to investing directly in a portfolio of MLPs.

Another advantage associated with the invention is the fact that the invention represents an attractive MLP asset class that offers potential for superior risk-adjusted total returns that are relatively uncorrelated with overall market performance. MLPs are characterized by stable cash flows, attractive growth profiles, high barriers to entry and tax-advantaged cash distributions. As an asset class, MLPs have produced attractive returns versus the S&P 500 over the past five, 10, and 15 year periods, coupled with a lower standard deviation (a measure of risk). In addition, MLPs have also historically enjoyed low correlation with the overall equity and debt markets and are generally not significantly exposed to commodity price fluctuations. As such, MLPs provide an attractive portfolio diversification and balancing alternative.

Typically, when equity securities held by an individual undergo an ownership transfer as part of an estate, the recipient of the security benefits from a step-up in tax cost basis to current market value, such that the recipient is not responsible for unrealized capital gains taxes on any pre-estate transfer appreciation. In the case of MLP securities, this step-up eliminates not only the capital gains tax liability, but also erases any deferred tax recapture liabilities associated with pre-estate transfer cash distributions, which would normally be taxed at ordinary income tax rates. As a result, any tax-deferred cash distributions received by the deceased party would not be subject to tax recapture, generating significant estate planning benefits relative to conventional equities (whose pre-estate transfer dividends are taxed in the period received).

The invention may be implemented to provide a single consolidated K-1 to its investors, and to file composite tax returns for its investors in states which allow it. In contrast, an investor building a personal portfolio of public MLPs would receive a K-1 from each individual MLP investment and may have to file tax returns in every state in which each MLP operates. As a result of the fund's composite filings, investors should enjoy substantially simpler tax filings and will have the ability to opt out of any composite state tax filings in which they do not wish to participate.

As previously indicated, MLPs are limited partnerships whose LP interests, known as units, are traded on securities exchanges like shares of common stock. Due to their partnership structure, MLPs generally do not pay income taxes at the entity level, creating a tax efficient method to pass cash flows on to investors.

MLPs were first introduced in the early 1980s, as issuers sought to take advantage of reduced individual income taxes and avoid double taxation. Congress passed legislation restricting the universe of industries eligible to utilize the MLP structure, stipulating that an MLP must derive at least 90% of its gross income from "Qualifying Income." Qualifying Income, as defined by Congress, includes income from interest, dividends, rents from real property, gain from the sale or disposition of real property, and income and gain from commodities or commodity futures and from the exploration, development, mining, production, processing, refining, transportation, or marketing of any mineral or natural resource, including fertilizer, geothermal energy, and timber.

The application of the MLP structure is broadening, however, as evidenced by the previously cited, commonly owned pending patent application entitled "Apparatus and Method for Operating a Death-Care business as a Master Limited Partnership", Ser. No. 10/306,836, filed Nov. 27, 2002. Barge and shipping MLPs have also been introduced.

The ownership structure of MLPs differs from that of traditional corporations. Typically, ownership of an MLP is divided into two types of interests, general partner interests and limited partner interests. The general partner typically owns 2% of the MLP and is the entity that manages and controls the MLP, while the limited partners own 98% of the MLP and have no role in management or governance.

When an MLP is taken public in an initial public offering, the LP interests are typically divided between common LP units and subordinated LP units. The common LP units are sold to public investors and listed on an exchange, while the subordinated LP units are typically retained by the pre-IPO investors and are not listed. Common LP unit holders are entitled to receive a minimum quarterly cash distribution from the MLP before the subordinated LP unit holders are eligible to receive their minimum quarterly distribution. As such, the subordinated LP units act as a distribution support mechanism to the common LP units, helping to ensure a consistent, stable yield to the common LP units. Typically, as the MLP meets certain distribution and earnings targets over a period of three to five years, the subordinated LP units become eligible for conversion into common LP units on a one-for-one basis.

To provide extra incentive for the MLP general partner to successfully manage the MLP and increase distributable cash flows, MLP partnership agreements typically provide that the general partner of each MLP receive an increasing proportion of distributable cash flow as distributions on the LP units reach higher pre-established target levels. The rights to receive these incentive distributions are known as Incentive Distribution Rights ("IDRs") and can prove to be very attractive to the MLP's general partner and to investors in the general partner. Although the percentages vary among MLPs, the general partner's marginal interest in distributions generally increases from 2% to 15% at the first designated distribution target level, moving up to 25% and ultimately 50% as pre-established distribution and earnings thresholds are met (see the illustrative IDR chart below). This incentive structure creates strong alignment of interests between management and investors and encourages distributable cash flow growth.

| Incentive Distribution Rights Illustration Assumes IPO pricing at $20.00/share and IPO yield of 10.0%, implying minimum quarterly distribution of $0.50/unit | | |
|---|---|---|
| Quarterly Distribution/Share | LP/GP Cash Flow Split | |
| Up to $0.55 | 98.0% | 2.0% |
| Between $0.55 and $0.63 | 85.0% | 15.0% |
| Between $0.63 and $0.75 | 75.0% | 25.0% |
| Greater than $0.75 | 50.0% | 50.0% |

As a result of their partnership structure, MLPs provide tax advantages to investors that corporations do not. First, income generated by an MLP is taxed only at the unit holder level, enabling investors to avoid double taxation, unlike traditional corporations that pay taxes on earnings that are then subject to a second layer of tax at the investor level when those earnings are distributed as dividends to investors. Second, MLP distributions are typically 75% to 95% tax deferred, since their cash distributions are largely treated as returns of capital. Specifically, an MLP investor's tax basis is decreased with each distribution and allocation of deductions (such as depreciation and losses), and increased with each allocation of taxable income. When an MLP unit is sold, the difference between the sales price and the investor's adjusted tax basis represents a gain or loss for federal income tax purposes (as such, this gain is eventually recognized with respect to these tax deferred distributions). This tax deferral feature renders MLPs especially attractive for individuals that will knowingly move into a lower tax bracket in the near-term future.

Historically, the MLP investor universe has been dominated primarily by individual U.S. investors. MLPs pose adverse tax consequences for most institutional investors, as MLPs cause regulatory complications for regulated investment companies (mutual funds) and generate Unrelated Business Taxable Income ("UBTI") for tax-exempt investors such as pension plans, endowments, employee benefit plans and individual retirement accounts. In addition, MLPs generate "effectively connected" income for non-U.S. investors that requires them to file and pay federal income taxes, and non-U.S. investors are subject to withholding on cash distributions by MLPs. Finally, although regulated investment companies may now invest in MLPs without adverse tax consequences, these entities are still restricted in the amount of MLP securities they may own. Due to this limited institutional participation, the MLP market can experience inefficiencies, such as the potential for improperly valued securities, especially within private entities which the fund, as a professionally managed investment vehicle designed specifically for taxable investors and the MLP investment space, is uniquely positioned to exploit.

Historically, MLPs have provided attractive returns, especially relative to the risk associated with the asset class. MLPs may be well-positioned to continue generating attractive risk-adjusted returns, due to: (i) the tax-advantaged nature of cash distributions associated with the MLP structure, which allows MLPs to command a lower cost of capital; (ii) the capital spending discipline imposed by MLP cash distribution requirements; (iii) the fact that most MLPs are mature, stable businesses that generate steady cash flows; and (iv) the market inefficiencies associated with limited institutional and non-U.S. investor presence in the MLP sector that experienced and knowledgeable investors, such as the fund, can capitalize on.

More recently, MLPs have significantly outperformed most major indices, including the S&P 500, the Russell 2000 and the NASDAQ Composite. As with any yield-oriented security, MLPs can be sensitive to changes in interest rates, but unlike traditional fixed-income investments, MLPs can significantly mitigate the impact of rising interest rates through growth in cash distributions. MLPS have steadily grown their cash distributions over the last five years, through both organic expansion and accretive acquisitions.

The invention may be implemented with a portfolio of investments in MLPs through open-market and privately negotiated investments. An appropriate public investment strategy is to generate attractive after-tax IRRs by building a portfolio of investments that exhibit a combination of: (i) an ability to maintain current distribution levels; (ii) growth in cash distributions; and (iii) high levels of tax-shielded distributions. Fundamental analysis may be used to identify those MLPs best positioned to provide attractive current distributions coupled with superior long-term, risk-adjusted growth potential. An actively managed portfolio of open-market and privately negotiated MLP investments (i.e., private placements) may generate superior results over a pure MLP index strategy. It is advisable to continually re-examine asset allocations to preserve prudent diversification, current yield, and superior risk-adjusted long-term growth potential. On the other hand, it is advisable to minimize the turnover of MLP investments in order to maximize the tax benefits to investors.

In evaluating public MLPs to be added to a fund's portfolio, one should focus on underlying industry fundamentals, including but not limited to such partnership characteristics as: (i) strength of management team; (ii) quality of recurring revenue and cash flow; (iii) exposure to commodity prices, (iv) balance sheet strength and cost of capital; and (v) distribution coverage (ratio of cash flows to common unit distributions).

It is advisable to favorably view investments in partnerships that are best positioned to pursue accretive acquisitions and deliver attractive total returns. As partnerships, most publicly-traded MLPs have a cost of capital advantage over "C" corporations because MLPs are not subject to entity-level income taxes. As such, MLPs are often better positioned to pursue accretive acquisitions in order to grow their quarterly distributions.

In addition to open-market investments, it is advisable to invest in private placements of MLPs to generate enhanced returns. It may be possible to make private purchases of MLP securities on attractive terms, including discounts to current market prices. Such investments constitute an attractive investment opportunity usually available only to institutional investors with large amounts of capital to invest.

In addition to equity investments, it is possible to invest in debt securities of MLPs. It is advisable to pursue these investments on an opportunistic basis when the debt securities provide an attractive risk/return profile consistent with the investment strategy of the fund. As the fund's investments in privately-held businesses are taken public, a substantial portion of the fund's assets will be invested in the subordinated LP units of these newly-public MLPs. As these subordinated LP units convert to common units over time, the fund will reassess its investments in these units and may rebalance its portfolio to provide for prudent diversification, strong current yield and potential for capital gain. One may manage issuer-specific risks by limiting investments in the securities of any single public issuer to 20% of the fund's gross assets.

There are attractive opportunities to generate returns in excess of 30% through private-to-public MLP investing: the process of acquiring private businesses with stable fundamentals and significant recurring cash flows that generate Qualifying Income, restructuring these businesses and taking them public as MLPs. These transactions may generate attractive returns due to: (i) limited competition for such investments from traditional private equity investors; (ii) tax efficiencies that can be realized as a result of the pass-through nature of partnership income; (iii) value arbitrage derived from the yield-based valuation methodology applied in the public MLP market; and (iv) organic growth and growth through accretive acquisitions. In addition, the Fund expects to benefit from ongoing ownership of the MLP GP's interests and IDRs in those businesses taken public through MLP restructurings. These IDRs can generate highly attractive returns which provide additional incentives to the MLP GP to grow quarterly cash distributions.

Historically, the MLP structure has primarily been used to capture Qualifying Income generated from energy and other natural resource assets, and Qualifying Income can be generated by a much wider range of assets, including: mining, real property, fertilizer, geothermal energy, sand, aggregates and asphalt, engineering and glued wood products, pulp and pulp mill operations trusses, beams, plywood, transportation of natural resources.

In addition to generating Qualifying Income, businesses in these industries are often asset-intensive, characterized by strong recurring cash flows and high barriers to entry. As such, they often share the stability and predictability associated with traditional MLP industries, thereby providing attractive investment opportunities and strengthening the private-to-public investing thesis.

It is preferable to identify businesses that: (i) exhibit strong fundamentals; (ii) have recurring cash flows that generate Qualifying Income; and (iii) can be restructured as publicly-traded MLPs. After investment, it is ideal to leverage expertise in private-to-public MLP investing to: (i) refocus operations on maximizing both recurring free cash flow and Qualifying Income; (ii) restructure these businesses as tax efficient partnerships; and (iii) take these restructured businesses public as MLPs as quickly as practicable.

Figure 5:
FIG. 5 is an example of a value arbitrage of restructuring a "C" corporation into an master limited partnership in accordance with an embodiment of the invention.

Once public, these businesses are expected to be valued on a yield basis, the standard valuation method for MLPs. Public market valuations of converted businesses should represent a premium to a fund's cost basis, due to (i) increased cash flow conversion associated with the elimination of corporate taxes and (ii) value arbitrage that can be realized through shifting from a private-market, Earnings Before Interest Taxes, Depreciation and Amortization (EBITDA)-based valuation methodology to a public-market, yield-based valuation methodology. An illustrative example of this value arbitrage is shown in FIG. 5. Successful execution of the private-to-public MLP investment strategy requires both an intimate familiarity with the legal, accounting, and operational nuances associated with MLPs and an ability to identify, acquire, and manage private companies with sound business fundamentals.

In one embodiment, a fund associated with the invention expects to: (i) invest in approximately one private investment per year (with the capacity to pursue additional private investments on an opportunistic basis); and (ii) limit investment activity in private businesses so that a minimum of 60% of the Fund's gross asset value is invested in securities of publicly-traded MLPs at all times.

Once public, converted businesses are expected to generate substantial value to Fund investors through (i) tax-advantaged current income; (ii) growth in cash distributions; and (iii) the Fund's ownership of IDRs. As publicly-traded MLPs, the Fund's restructured businesses should have access to public equity capital to fund both organic expansion and growth through acquisitions. In particular, the potential for these businesses to execute value-creating acquisitions is enhanced by the cost of capital advantage that these businesses should enjoy over many corporate buyers, especially private equity funds. This lower cost of capital enables MLPs to consummate accretive transactions that would prove dilutive for many purchasers. As discussed above, private-market transactions in the Fund's targeted industries are typically valued according to a multiple of EBITDA. The Fund expects restructured businesses to trade at a premium to private market values, due to their enhanced tax efficiency and yield-based public valuations. As such, private market acquisitions can prove highly cash accretive for the fund's restructured businesses, increasing quarterly cash distributions and thereby driving unit price appreciation.

By retaining a significant LP interest in the businesses that are restructured and taken public as MLPs, investors should benefit directly from growth in distributable cash flow. In addition, fund investors can derive significant incremental upside through the ongoing participation in the general partner interests and IDRs associated with the successful execution of the Fund's private-to-public MLP investing strategy. General partners in publicly-traded MLPs typically own IDRs, which grant the general partner an increasing share of incremental cash flows above specified distribution thresholds. These IDRs are designed to promote alignment of interests between management teams and investors, encouraging management to grow distributable cash flows. As the fund's controlled MLP assets increase their cash distributions, the fund should enjoy a disproportionate share of this increase through its ownership of these IDRs, generating potential upside for investors.

Figure 6:
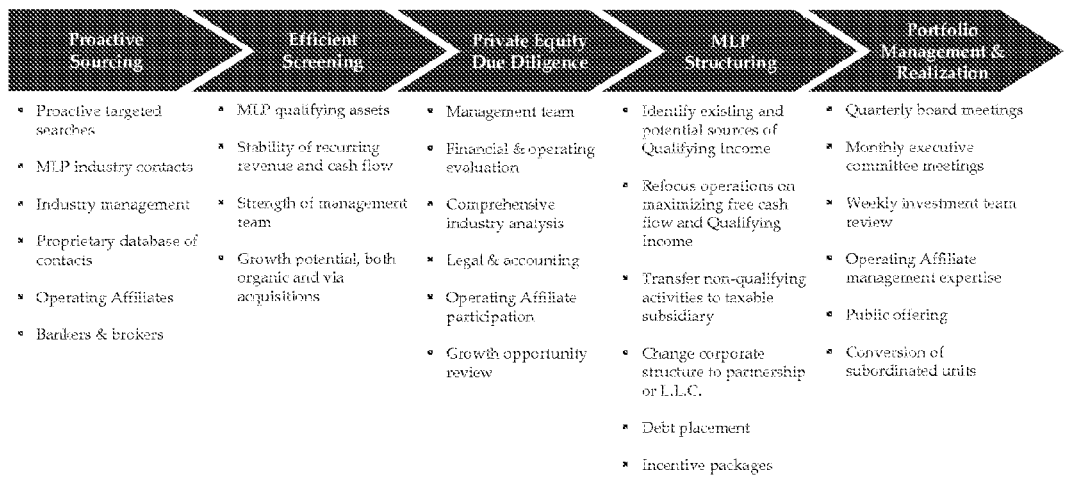
FIG. 6 provides information on a private-to-public investment process utilized in accordance with an embodiment of the invention.

Private-to-public investment may be based on four key elements: (i) ability to generate Qualifying Income; (ii) stability of recurring cash flow; (iii) strength of management team; and (iv) growth potential, both organically and via acquisitions. It is ideal that generate Qualifying Income, and then search for the best possible platform company and management team within the sector. The private-to-public investment process includes five key components: (i) transaction sourcing; (ii) MLP qualification and transaction screening; (iii) due diligence; (iv) structuring; and (v) active portfolio management and realization, as illustrated in FIG. 6.

It is advisable to seek to purchase assets both within those industries typically associated with MLPs and in other industries that represent new applications of the MLP structure. Along with investments in the energy infrastructure space, it is advisable to pursue investments in a broader set of industries, including mining, fertilizer, geothermal energy, engineered and glued wood products and the sale and rental of real property.

Investment opportunities may be pursued by first identifying an attractive industry for the private-to-public MLP investment strategy. The ideal platform company and management team from which to build an industry-leading enterprise is then identified. This may lead to a relatively non-competitive investment opportunity.

From time to time it may be advisable to engage intermediaries that are particularly effective at identifying targets consistent with the investment strategy. Such engagements may be structured primarily on a success fee basis.

It is advisable to actively communicate with industry participants to ensure their understanding of a fund's focused strategy. By raising the awareness of a fund's unique attributes, such as its conservative use of leverage and MLP domain expertise, industry participants will potentially see the fund as a preferred buyer. As a result, one may receive an early, if not first, call for the more attractive MLP opportunities. Thus, experienced management teams in industries with assets that generate Qualifying Income may increasingly approach the fund directly.

Potential private investments should initially be screened based on their ability to be restructured as MLPs in order to ensure the efficient use of time and maximize the resources of a fund. For a business to qualify for pass-through tax treatment as an MLP, at least 90% of the partnership's gross income must be Qualifying Income. It is important to evaluate the nature of a target's income streams and then restructure operations in order to meet this Qualifying Income test. If a target acquisition has less than 90% Qualifying Income, operations can be segmented with activities that generate non-Qualifying Income held by taxable subsidiaries, such that substantially all of the partnership's income will be Qualifying Income.

Since MLPs are structured to distribute substantially all available cash generated by operations to the unit holders at consistent levels on a quarterly basis, it is essential that their revenue and cash flow be as stable and secure as possible. A fund should execute private-to-public investments in businesses with a demonstrated history of generating strong recurring free cash flow. In screening potential target acquisitions, one should undertake a detailed evaluation of a target's revenue streams and expenses in order to ensure reliable, recurring free cash flow.

In order to maximize value creation through the private-to-public MLP investment process, it is advisable to seek to make investments in businesses with strong growth potential to enhance distributable cash flow. Given the need for stable recurring cash flow, many attractive investments in targeted industries may have somewhat limited organic growth potential. Therefore, it is advisable to seek to invest in industries that remain fragmented to support growth through acquisition.

In order to select the most compelling acquisition opportunities, it is advisable to design a process to review and evaluate all aspects of due diligence, including detailed reviews of financial performance, management competency, accounting, strategic and operational planning and execution, and specific MLP structuring issues. This analysis allows the fund to make informed investment decisions based on achievable business plans that are driven by key operating metrics and geared toward performance targets extrapolated from historical financial performance.

In structuring investments, it is advisable to capitalize target businesses such that the potential for outstanding investment returns is prudently balanced with the amount of risk created by adding leverage to the balance sheet. Prior to closing a transaction, it is advisable to work closely with company management to identify current and potential sources of Qualifying Income and focus operations on maximizing free cash flow from qualifying sources. This process can involve thorough overhauls of management incentive structures, sales and marketing procedures, and business development initiatives. In addition, the target business should be restructured from a "C" corporation to an MLP-eligible partnership or limited liability company, which can include relocating all non-Qualifying revenue into taxable subsidiaries.

The general partner will typically receive a management fee based upon the dividend income and/or the equity revenue. For example, the general partner may receive an annual management fee equal to 2% of the greater of the net asset value of the fund's assets and the fund's aggregate contributed capital. The management fee may be paid quarterly. The management fee is in addition to the equity interest that management may have in a fund.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
record received investment capital from investors;
monitor a subsequent investment of the investment capital in private company legal entities;
convert the private company legal entities to master limited partnerships;
aggregate the master limited partnerships under the control of a publicly traded master limited partnership; and
distribute income from the publicly traded master limited partnership to the investors.

2. The computer readable storage medium of claim 1 wherein the private company legal entities are in different sectors.

* * * * *